(12) United States Patent
Pfeifer et al.

(10) Patent No.: US 12,208,475 B2
(45) Date of Patent: Jan. 28, 2025

(54) OPTICAL-BASED WELD TRAVEL SPEED SENSING SYSTEM

(71) Applicant: Illinois Tool Works Inc., Glenview, IL (US)

(72) Inventors: Kyle Andrew Pfeifer, Appleton, WI (US); Todd Earl Holverson, Appleton, WI (US); William Todd Watson, Mount Prospect, IL (US); Richard Martin Hutchison, Iola, WI (US); William Joshua Becker, Manitowoc, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 529 days.

(21) Appl. No.: 17/031,394

(22) Filed: Sep. 24, 2020

(65) Prior Publication Data
US 2021/0016382 A1    Jan. 21, 2021

Related U.S. Application Data (63) Continuation of application No. 15/384,085, filed on Dec. 19, 2016, now Pat. No. 11,612,949, which is a
(Continued)

(51) Int. Cl.
*B23K 9/095* (2006.01)
*G01P 3/36* (2006.01)
(Continued)

(52) U.S. Cl.
CPC ............ *B23K 9/0956* (2013.01); *B23K 9/095* (2013.01); *B23K 9/0953* (2013.01); *G01P 3/36* (2013.01);
(Continued)

(58) Field of Classification Search
CPC .... B23K 9/0956; B23K 9/095; B23K 9/0953; G01P 3/36; G01P 3/38; G01S 11/12; G01S 11/14; G01S 17/58
See application file for complete search history.

(56) References Cited

U.S. PATENT DOCUMENTS

| 1,340,270 | A | 5/1920 | Emil |
| 2,045,800 | A | 6/1936 | Walther |
| (Continued) |

FOREIGN PATENT DOCUMENTS

| CA | 2311685 | 12/2001 |
| CA | 2517874 | 12/2001 |
| (Continued) |

OTHER PUBLICATIONS

"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.

(Continued)

*Primary Examiner* — Brian W Jennison
(74) *Attorney, Agent, or Firm* — McAndrews, Held & Malloy, Ltd.

(57) ABSTRACT

A travel speed sensing system includes an optical sensor configured to be coupled to a welding torch. The optical sensor is configured to sense light incident on the optical sensor, and the travel speed sensing system is configured to determine a travel speed of the welding torch, a direction of the welding torch, or both, based on the sensed light.

20 Claims, 7 Drawing Sheets

Related U.S. Application Data continuation of application No. 13/740,964, filed on Jan. 14, 2013, now Pat. No. 9,522,437.

(60) Provisional application No. 61/597,556, filed on Feb. 10, 2012.

(51) Int. Cl.
*G01P 3/38* (2006.01)
*G01S 11/12* (2006.01)
*G01S 11/14* (2006.01)
*G01S 17/58* (2006.01)

(52) U.S. Cl.
CPC ............... *G01P 3/38* (2013.01); *G01S 11/12* (2013.01); *G01S 11/14* (2013.01); *G01S 17/58* (2013.01)

(56) References Cited

U.S. PATENT DOCUMENTS

| | | |
|---|---|---|
| 2,045,801 A | 6/1936 | Richter |
| 2,045,802 A | 6/1936 | Walther |
| 2,333,192 A | 10/1942 | Moberg |
| 2,351,910 A | 6/1944 | Blankenbuehler |
| 3,702,915 A | 11/1972 | Vilkas |
| 3,867,769 A | 2/1975 | Schow |
| 4,028,522 A | 6/1977 | Chihoski |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom |
| 4,359,624 A | 11/1982 | Wascat |
| 4,396,945 A | 8/1983 | DiMatteo |
| 4,399,346 A | 8/1983 | Kearney |
| 4,452,589 A | 6/1984 | Denison |
| 4,459,114 A | 7/1984 | Barwick |
| 4,493,968 A * | 1/1985 | Brown ............... B23Q 35/127 348/90 |
| 4,518,361 A | 5/1985 | Conway |
| 4,532,405 A | 7/1985 | Corby, Jr. |
| 4,541,055 A | 9/1985 | Wolfe |
| 4,555,614 A | 11/1985 | Morris |
| 4,577,499 A | 3/1986 | Silke |
| 4,581,518 A | 4/1986 | Takahashi |
| 4,591,689 A | 5/1986 | Brown |
| 4,594,497 A | 6/1986 | Takahashi |
| 4,595,368 A | 6/1986 | Cole |
| 4,595,820 A | 6/1986 | Richardson |
| 4,609,806 A | 9/1986 | Grabkowski |
| 4,613,743 A | 9/1986 | Nied |
| 4,616,121 A | 10/1986 | Clocksin |
| 4,628,176 A | 12/1986 | Kojima |
| 4,638,146 A | 1/1987 | Koyama |
| 4,675,502 A | 6/1987 | Haefner |
| 4,680,014 A | 7/1987 | Paton |
| 4,689,021 A | 8/1987 | Vasiliev |
| 4,711,986 A * | 12/1987 | Lillquist ............. B23K 9/0956 219/130.21 |
| 4,716,273 A | 12/1987 | Paton |
| 4,721,947 A | 1/1988 | Brown |
| 4,724,302 A | 2/1988 | Penney |
| 4,728,768 A | 3/1988 | Cueman |
| 4,739,404 A | 4/1988 | Richardson |
| 4,867,685 A | 9/1989 | Brush |
| 4,868,649 A | 9/1989 | Gaudin |
| 4,881,678 A | 11/1989 | Gaudin |
| 4,931,018 A | 6/1990 | Herbst et al. |
| 4,937,427 A | 6/1990 | McVicker |
| 4,943,702 A | 7/1990 | Richardson |
| 4,954,690 A | 9/1990 | Kensrue |
| 4,996,409 A | 2/1991 | Paton |
| 5,045,669 A | 9/1991 | Ortiz, Jr. |
| 5,061,841 A | 10/1991 | Richardson |
| 5,185,561 A | 2/1993 | Good |
| 5,211,564 A | 8/1993 | Martinez |
| 5,275,327 A | 1/1994 | Watkins |
| 5,283,418 A | 2/1994 | Bellows |
| 5,304,774 A | 4/1994 | Durheim |
| 5,306,893 A | 4/1994 | Morris |
| 5,320,538 A | 6/1994 | Baum |
| 5,334,816 A | 8/1994 | Sugiyama |
| 5,343,011 A | 8/1994 | Fujii |
| 5,380,978 A | 1/1995 | Pryor |
| 5,397,872 A | 3/1995 | Baker |
| 5,426,732 A | 6/1995 | Boies |
| 5,464,957 A | 11/1995 | Kidwell |
| 5,465,037 A | 11/1995 | Huissoon |
| 5,514,846 A | 5/1996 | Cecil |
| 5,517,420 A | 5/1996 | Kinsman |
| 5,521,843 A | 5/1996 | Hashima |
| 5,571,431 A | 11/1996 | Lantieri |
| 5,617,335 A | 4/1997 | Hashima |
| 5,653,897 A | 8/1997 | Findlan |
| 5,659,479 A | 8/1997 | Duley |
| 5,674,415 A | 10/1997 | Leong |
| 5,675,229 A | 10/1997 | Thorne |
| 5,681,490 A | 10/1997 | Chang |
| 5,698,120 A | 12/1997 | Kurosawa |
| 5,708,253 A | 1/1998 | Bloch |
| 5,709,219 A | 1/1998 | Chen |
| 5,728,992 A | 3/1998 | Swidwa |
| 5,747,042 A | 5/1998 | Choquet |
| 5,823,785 A | 10/1998 | Matherne, Jr. |
| 5,832,139 A | 11/1998 | Batterman |
| 5,856,844 A | 1/1999 | Batterman |
| 5,930,093 A | 7/1999 | Morrissett |
| 5,932,122 A | 8/1999 | Hong |
| 5,999,909 A | 12/1999 | Rakshit |
| 6,018,729 A | 1/2000 | Zacharia |
| 6,039,494 A | 3/2000 | Pearce |
| 6,046,431 A | 4/2000 | Beattie |
| 6,049,059 A | 4/2000 | Kim |
| 6,051,805 A | 4/2000 | Vaidya |
| 6,155,475 A | 12/2000 | Ekelof |
| 6,163,946 A | 12/2000 | Pryor |
| 6,172,327 B1 | 1/2001 | Aleshin |
| 6,226,395 B1 | 5/2001 | Gilliland |
| 6,236,017 B1 | 5/2001 | Smartt et al. |
| 6,242,711 B1 | 6/2001 | Cooper |
| 6,271,500 B1 | 8/2001 | Hirayama |
| 6,290,740 B1 | 9/2001 | Schaefer |
| 6,301,763 B1 | 10/2001 | Pryor |
| 6,315,186 B1 | 11/2001 | Friedl |
| 6,329,635 B1 | 12/2001 | Leong |
| 6,337,458 B1 | 1/2002 | Lepeltier |
| 6,371,765 B1 | 4/2002 | Wall |
| 6,441,342 B1 | 8/2002 | Hsu |
| 6,445,964 B1 | 9/2002 | White |
| 6,476,354 B1 | 11/2002 | Jank |
| 6,479,793 B1 | 11/2002 | Wittmann |
| 6,506,997 B2 | 1/2003 | Matsuyama |
| 6,516,300 B1 | 2/2003 | Rakshit |
| 6,572,379 B1 | 6/2003 | Sears |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,647,288 B2 | 11/2003 | Madill |
| 6,697,761 B2 | 2/2004 | Akatsuka |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl |
| 6,744,011 B1 | 6/2004 | Hu |
| 6,750,428 B2 | 6/2004 | Okamoto |
| 6,768,974 B1 | 7/2004 | Nanjundan |
| 6,839,049 B1 | 1/2005 | Koizumi |
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |

(56) References Cited

U.S. PATENT DOCUMENTS

| | | |
|---|---|---|
| 6,937,329 B2 | 8/2005 | Esmiller |
| 6,977,357 B2 | 12/2005 | Hsu |
| 6,995,536 B2 | 2/2006 | Challoner |
| 7,015,419 B2 | 3/2006 | Hackl |
| 7,045,742 B2 | 5/2006 | Feichtinger |
| 7,132,617 B2 | 11/2006 | Lee |
| 7,132,623 B2 | 11/2006 | DeMiranda |
| 7,150,047 B2 | 12/2006 | Fergason |
| 7,181,413 B2 | 2/2007 | Hadden |
| 7,342,210 B2 | 3/2008 | Fergason |
| 7,358,458 B2 | 4/2008 | Daniel |
| 7,465,230 B2 | 12/2008 | LeMay |
| 7,474,760 B2 | 1/2009 | Hertzman |
| 7,523,069 B1 | 4/2009 | Friedl et al. |
| 7,564,005 B2 | 7/2009 | Cabanaw |
| 7,574,172 B2 | 8/2009 | Clark et al. |
| D614,217 S | 4/2010 | Peters |
| 7,698,094 B2 | 4/2010 | Aratani |
| D615,573 S | 5/2010 | Peters |
| 7,789,811 B2 | 9/2010 | Cooper |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 * | 6/2011 | Becker ............. B23K 9/322 2/8.8 |
| 8,019,144 B2 | 9/2011 | Sugihara |
| 8,100,694 B2 | 1/2012 | Portoghese |
| 8,248,324 B2 | 8/2012 | Nangle |
| 8,274,013 B2 | 9/2012 | Wallace |
| 8,316,462 B2 | 11/2012 | Becker et al. |
| 8,406,682 B2 | 3/2013 | Elesseily |
| 8,431,862 B2 | 4/2013 | Kachline |
| 8,432,476 B2 | 4/2013 | Ashforth |
| 8,512,043 B2 | 8/2013 | Choquet |
| 8,657,605 B2 | 2/2014 | Wallace |
| 8,681,178 B1 | 3/2014 | Tseng |
| 8,692,157 B2 | 4/2014 | Daniel |
| 8,698,843 B2 | 4/2014 | Tseng |
| 8,747,116 B2 | 6/2014 | Zboray et al. |
| 8,834,168 B2 | 9/2014 | Peters |
| 8,851,896 B2 | 10/2014 | Wallace |
| 8,860,760 B2 | 10/2014 | Chen |
| 8,915,740 B2 | 12/2014 | Zboray |
| 8,953,909 B2 | 2/2015 | Guckenberger |
| 8,990,842 B2 | 3/2015 | Rowley |
| 9,011,154 B2 | 4/2015 | Kindig |
| 2001/0032508 A1 | 10/2001 | Lemkin |
| 2002/0114653 A1 | 8/2002 | Gatta |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0069754 A1 | 4/2004 | Bates |
| 2004/0175684 A1 | 9/2004 | Kaasa |
| 2004/0251910 A1 | 12/2004 | Smith |
| 2005/0006363 A1 | 1/2005 | Hsu |
| 2005/0017152 A1 | 1/2005 | Fergason |
| 2005/0127052 A1 | 6/2005 | Spencer |
| 2005/0133488 A1 | 6/2005 | Blankenship |
| 2005/0135682 A1 | 6/2005 | Abrams |
| 2005/0197115 A1 | 9/2005 | Clark et al. |
| 2005/0256611 A1 | 11/2005 | Pretlove |
| 2006/0010551 A1 | 1/2006 | Bishop |
| 2006/0136183 A1 | 6/2006 | Choquet |
| 2006/0163228 A1 | 7/2006 | Daniel |
| 2006/0173619 A1 | 8/2006 | Brant |
| 2006/0241432 A1 | 10/2006 | Herline |
| 2007/0038400 A1 | 2/2007 | Lee |
| 2007/0114215 A1 | 5/2007 | Bill |
| 2007/0164006 A1 | 7/2007 | Burgstaller |
| 2007/0187378 A1 | 8/2007 | Karakas |
| 2007/0188606 A1 | 8/2007 | Atkinson |
| 2007/0248261 A1 | 10/2007 | Zhou |
| 2007/0264620 A1 | 11/2007 | Maddix |
| 2007/0278196 A1 | 12/2007 | James |
| 2008/0038702 A1 | 2/2008 | Choquet |
| 2008/0061113 A9 | 3/2008 | Seki |
| 2008/0124698 A1 | 5/2008 | Ebensberger |
| 2008/0149608 A1 | 6/2008 | Albrecht |
| 2008/0158502 A1 | 7/2008 | Becker |
| 2008/0169277 A1 | 7/2008 | Achtner |
| 2008/0314887 A1 | 12/2008 | Stoger |
| 2009/0005728 A1 | 1/2009 | Weinert |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson et al. |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker |
| 2009/0249606 A1 | 10/2009 | Diez |
| 2009/0298024 A1 | 12/2009 | Batzler |
| 2010/0048273 A1 | 2/2010 | Wallace |
| 2010/0062405 A1 | 3/2010 | Zboray |
| 2010/0062406 A1 | 3/2010 | Zboray |
| 2010/0133247 A1 | 6/2010 | Mazumder |
| 2010/0201803 A1 | 8/2010 | Melikian |
| 2010/0207620 A1 | 8/2010 | Gies |
| 2010/0224610 A1 | 9/2010 | Wallace |
| 2010/0283588 A1 | 11/2010 | Gomez |
| 2010/0291313 A1 | 11/2010 | Ling |
| 2011/0000892 A1 | 1/2011 | Mueller |
| 2011/0006047 A1 | 1/2011 | Penrod |
| 2011/0091846 A1 | 4/2011 | Kreindl |
| 2011/0092828 A1 | 4/2011 | Spohn |
| 2011/0117527 A1 * | 5/2011 | Conrardy ............. B23K 9/291 434/234 |
| 2011/0183304 A1 | 7/2011 | Wallace |
| 2011/0186615 A1 | 8/2011 | Gatlin |
| 2011/0220616 A1 | 9/2011 | Mehn |
| 2011/0220619 A1 | 9/2011 | Mehn |
| 2011/0249090 A1 | 10/2011 | Moore |
| 2011/0290765 A1 | 12/2011 | Albrecht |
| 2011/0313731 A1 | 12/2011 | Vock |
| 2012/0072021 A1 | 3/2012 | Walser |
| 2012/0077174 A1 | 3/2012 | DePaul |
| 2012/0105476 A1 | 5/2012 | Tseng |
| 2012/0122062 A1 | 5/2012 | Yang et al. |
| 2012/0160819 A1 | 6/2012 | Enyedy |
| 2012/0180180 A1 | 7/2012 | Steve |
| 2012/0189993 A1 | 7/2012 | Kindig |
| 2012/0231894 A1 | 9/2012 | Nicora |
| 2012/0248080 A1 | 10/2012 | Hutchison |
| 2012/0248083 A1 | 10/2012 | Garvey |
| 2012/0273473 A1 | 11/2012 | Zhang |
| 2012/0291172 A1 | 11/2012 | Wills |
| 2012/0298640 A1 | 11/2012 | Conrardy |
| 2012/0318775 A1 | 12/2012 | Schwarz |
| 2012/0323496 A1 | 12/2012 | Burroughs |
| 2013/0040270 A1 | 2/2013 | Albrecht |
| 2013/0081293 A1 | 4/2013 | Delin |
| 2013/0189656 A1 | 7/2013 | Zboray |
| 2013/0189658 A1 | 7/2013 | Peters |
| 2013/0200882 A1 | 8/2013 | Almalki |
| 2013/0206741 A1 | 8/2013 | Pfeifer et al. |
| 2013/0208569 A1 | 8/2013 | Pfeifer |
| 2013/0209976 A1 | 8/2013 | Postlethwaite |
| 2013/0264315 A1 | 10/2013 | Hung |
| 2013/0288211 A1 | 10/2013 | Patterson |
| 2014/0014638 A1 | 1/2014 | Artelsmair |
| 2014/0017642 A1 | 1/2014 | Postlethwaite |
| 2014/0131337 A1 | 5/2014 | Williams |
| 2014/0134579 A1 | 5/2014 | Becker |
| 2014/0134580 A1 | 5/2014 | Becker |
| 2014/0172399 A1 | 6/2014 | Ume |
| 2014/0184496 A1 | 7/2014 | Gribetz |
| 2014/0263224 A1 | 9/2014 | Becker |
| 2014/0263227 A1 | 9/2014 | Daniel et al. |

(56) References Cited

U.S. PATENT DOCUMENTS

| | | | |
|---|---|---|---|
| 2014/0272835 | A1 | 9/2014 | Becker |
| 2014/0272836 | A1 | 9/2014 | Becker |
| 2014/0272837 | A1 | 9/2014 | Becker |
| 2014/0272838 | A1 | 9/2014 | Becker |
| 2014/0315167 | A1 | 10/2014 | Kreindl |

FOREIGN PATENT DOCUMENTS

| | | |
|---|---|---|
| CA | 2549553 | 7/2004 |
| CA | 2554498 | 4/2006 |
| DE | 102010038902 | 2/2012 |
| EP | 0323277 | 7/1989 |
| EP | 0878263 | 11/1998 |
| EP | 0963744 | 12/1999 |
| EP | 1029306 | 8/2000 |
| EP | 1295195 | 6/2001 |
| EP | 1573699 | 9/2005 |
| EP | 1797545 | 6/2007 |
| EP | 2022592 | 2/2009 |
| ES | 2438440 | 1/2014 |
| FR | 1456780 | 7/1966 |
| FR | 2827066 | 1/2003 |
| GB | 2454232 A | 5/2009 |
| JP | H09220690 | 8/1997 |
| JP | H11146387 | 5/1999 |
| JP | 2000298427 | 10/2000 |
| JP | 2004181493 | 7/2004 |
| JP | 2007021542 | 2/2007 |
| JP | 2008110388 | 5/2008 |
| JP | 2009125790 | 6/2009 |
| KR | 100876425 | 12/2008 |
| SU | 972552 | 11/1982 |
| SU | 1354234 | 11/1987 |
| SU | 1489933 | 6/1989 |
| SU | 1638145 | 3/1991 |
| WO | 03019349 | 1/2003 |
| WO | 2004057554 | 7/2004 |
| WO | 2005102230 | 11/2005 |
| WO | 2005110658 | 11/2005 |
| WO | 2006034571 | 4/2006 |
| WO | 2007009131 | 1/2007 |
| WO | 2009022443 | 2/2009 |
| WO | 2009053829 | 4/2009 |
| WO | 2009060231 | 5/2009 |
| WO | 2009092944 | 7/2009 |
| WO | 2009146359 | 12/2009 |
| WO | 2010000003 | 1/2010 |
| WO | 2010020867 | 2/2010 |
| WO | 2010020870 | 2/2010 |
| WO | 2012137060 | 10/2012 |
| WO | 2013023012 | 2/2013 |
| WO | 2013138831 | 9/2013 |
| WO | 2014007830 | 1/2014 |

OTHER PUBLICATIONS

"NJC Technology Displayed at ShipTech 2005", Welding Journal, vol. 84, No. 3, Mar. 2005, p. 54, https://app.aws.org/w/r/www/wj/2005/03/WJ_2005_03.pdf.
"Sheet Metal Conference XXII," Conference Program, American Welding Society, May 2006, Detroit.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Vision for Welding Industry," American Welding Society, Apr. 22, 1999, http://www.aws.org/library/doclib/vision.pdf.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with the American Welding Society and the Edison Welding Institute, Sep. 2000.
123arc.com—"Weld into the future"; 2000.
123arc.com; Products; http://www.123arc.co/en/products/htm; accessed: Apr. 11, 2013.
Advance Program of American Welding Society Programs and Events, Nov. 11-14, 2007, Chicago.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Aiteanu, Dorin, et al., "A Step Forward in Manual Welding: Demonstration of Augmented Reality Helmet," Institute of Automation, University of Bremen, Germany, 2003.
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
American Welding Society Forms: typical Procedure Qualification Record and Welding Procedure Specification forms.
American Welding Society's Virtual Welding Trailer to Debut at FABTECH Careers in Welding Trailer Appeals to New Generation of Welders, Miami, Florida, Nov. 3, 2011.
ARC+ Virtual Welding Simulator; 123 Certification Inc.; Feb. 2009; Montreal, Quebec.
ArcSentry Weld Monitoring System, Version 3, Users Manual, Native American Technologies, Golden, CO, Dec. 10, 1999.
ARVIKA Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R.; "Total Welding Managemet," American Welding Society, 2005.
Bender Shipbuilding and Repair, Co., "Virtual Welding—A Low Cost Virtual Reality Welder Training System", Technical Proposal, Jan. 23, 2008.
Byrd, Alex Preston, "Identifying the effects of human factors and training methods on a weld training program" (2014). Graduate Theses and Dissertations. Paper 13991.
Central Welding Supply http://www.welders-direct.com/ Feb. 29, 2000.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cote, Allan et al. (Presenters); Virtual Reality Welder Training; Project Review for Ship Tech 2005; Project No. S1051; Mar. 1, 2005; Biloxi MS.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19 -22, 2007.
EWI, "EWI ArcCheck," marketing brochure, Columbus, Ohio, 1 page.

(56) References Cited

OTHER PUBLICATIONS

EWI, "EWI SkillBuilder," marketing brochure, Columbus, Ohio, 1 page.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/pIV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.
Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
Fronius International; Product Description—Fronius Virtual Welding; http://www.fronius.com/cps/rde/xchg/SID-9C1850B-518E8F49/fronius_international/hs.xsl/79_15490_ENG_HTML.htm#produkt; accessed: Apr. 11, 2013.
Fronius Perfect Welding; 06,3082, EN v01 2010 aw05; Virtual Welding—The training method of the future; Feb. 20, 2012.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta . . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.
Quebec International, May 28, 2008 'Video Game' Technology to Fill Growing Need; http://www.mri.gouv.qc.ca/portail_scripts/actualities/viewnew.sap?NewID=5516.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.
Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.
TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .
TeachWELD: Welding Simulator/Hands-On Learning for Welding: http://realityworks.com/products/teachweld-welding-simulator; 2012.
TEREBES; miscellaneous examples from http://www.terebes.uni-bremen.de.
The Rutgers Master II—New Design Force-Feedback Glove by Mourad Bouzit, Member, IEEE, Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.
VRTEX Virtual Reality Arc Welding Trainer, Lincoln Electric; http://www.lincolnelectric.cm/en-us/equipment/training-equipment/Pages/vrtex.aspx; accessed: Apr. 11, 2013.
Welding Journal, American Welding Society, Nov. 2007, https://app.aws.org/wj/2007/11/WJ_2007_11.pdf.
White, S., et al., "Low-Cost Simulated MIG Welding for Advancement in Technical Training," Virtual Reality, 15, 1, 69-81, Mar. 2011. ISSN: 13594338 [Retrieved from EBSCOhost, Jun. 15, 2015].
Hillers, Bernd, Dorin Aiteanu, Axel Graser, "Augmented Reality—Helmet for the Manual Welding Process," Virtual and Augmented Reality Applications in Manufacturing, Institute of Automation, University of Bremen, 2004.
Himperich, Frederick, "Applications in Augmented Reality in the Automotive Industry," Fachgebiet Augmented Reality, Department of Informatics, Jul. 4, 2007, p. 1-21.
http://www.123arc.com "Simulation and Certification"; 2000.
Image from Sim Welder.com—R-V's Welder Training Goes Virtual, www.rvii.com/PDF/simwelder.pdf; Jan. 2010.
Impact Spring 2012 Volume 12, No. 2, Undergraduate Research in Information Technology Engineering, University of Virginia School of Engineering & Applied Science; 2012.
Impact Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
International Search Report for PCT application No. PCT/US2009/045436, dated Nov. 9, 2009, 3 pgs.
International Search Report for PCT application No. PCT/US2012/050059, dated Nov. 27, 2012, 16 pgs.
International Search Report for PCT application No. PCT/US2013/038371, dated Jul. 31, 2013, 8 pgs.

(56) References Cited

OTHER PUBLICATIONS

International Search Report for PCT application No. PCT/US2013/066037, dated Mar. 11, 2014, 10 pgs.
International Search Report for PCT application No. PCT/US2013/066040, dated Mar. 11, 2014, 12 pgs.
International Search Report for PCT application No. PCT/US2014/018107, dated Jun. 2, 2014, 3 pgs.
International Search Report for PCT application No. PCT/US2014/018109, dated Jun. 2, 2014, 4 pgs.
International Search Report for PCT application No. PCT/US2014/018113, dated Jun. 2, 2014, 3pgs.
International Search Report for PCT application No. PCT/US2014/018114, dated Jun. 2, 2014, 4 pgs.
International Search Report for PCT application No. PCT/US2014/065498, dated May 11, 2015, 13 pgs.
International Search Report for PCT application No. PCT/US2014/065506, dated Jun. 26, 2015, 16 pgs.
International Search Report for PCT application No. PCT/US2014/065512, dated Jun. 8, 2015, 17 pgs.
International Search Report for PCT application No. PCT/US2014/065525, dated Jul. 23, 2015, 16 pgs.
International Search Report for PCT application No. PCT/US2014/067951, dated Feb. 24, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Kiwinakiful; Holographic TV coming 2012 (as seen on BBC); http://www.youtube.com/watch?v=Ux6aD6vE9sk&feature=related, Jul. 2, 2011.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
Maccormick, John; How does the Kinect work ?; http://users.dickinson.edu/~jmac/selected-talks/kinect.pdf, Dec. 1, 2011.
NAMeS, Native American Technologies Weld Measuring Software, Users Guide, 2000.
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid . . . .
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
NAMeS Users Guide, N A Tech Neural Applications, Copyright 1997, 1998, 1999, 2000 Golden, CO (123 pages).
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
Cho, Min Hyn, Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS=DOWNLOAD_ETD_SUB_DOC_ACCNUM:::F1501_ID:osu1155741113, attachment.
NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
PCT International Search Report for PCT Application No. PCT/US2013/025050 mailed Jun. 7, 2013, 16 pgs.
PCT International Search Report for PCT Application No. PCT/US2013/025071 mailed Jun. 7, 2013, 13 pgs.
PCT International Search Report for PCT Application No. PCT/US2013/025081 maile Jun. 7, 2013, 11 pgs.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al., EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.

\* cited by examiner

OPTICAL-BASED WELD TRAVEL SPEED SENSING SYSTEM

CROSS REFERENCE TO RELATED APPLICATIONS

The present application is a continuation of co-pending U.S. patent application Ser. No. 15/384,085, entitled "OPTICAL-BASED WELD TRAVEL SPEED SENSING SYSTEM," filed Dec. 19, 2016, which is a continuation of U.S. patent application Ser. No. 13/740,964, filed Jan. 14, 2013, which claims the benefit of U.S. Provisional Patent Application No. 61/597,556, entitled "WELD TRAVEL SPEED SENSING SYSTEMS AND METHODS," filed Feb. 10, 2012, each of which is herein incorporated by reference in its entirety.

BACKGROUND

The invention relates generally to welding systems, and, more particularly, to sensing systems for monitoring a travel speed of a welding torch during a welding operation.

Welding is a process that has become ubiquitous in various industries for a variety of types of applications. For example, welding is often performed in applications such as shipbuilding, aircraft repair, construction, and so forth. While these welding operations may be automated in certain contexts, there still exists a need for manual welding operations. In some manual welding operations, it may be desirable to monitor weld parameters, such as the travel speed of the welding torch, throughout the welding operation. While the travel speed of an automated torch may be robotically controlled, the travel speed of the welding torch in manual operations may depend on the operator's welding technique and pattern. Unfortunately, it may be difficult to measure this weld motion during a welding operation due to features of the welding environment, operator considerations, and so forth.

BRIEF DESCRIPTION

In a first embodiment, a travel speed sensing system includes an optical sensor configured to be coupled to a welding torch. The optical sensor is configured to sense light incident on the optical sensor, and the travel speed sensing system is configured to determine a travel speed of the welding torch, a direction of the welding torch, or both, based on the sensed light.

In another embodiment, a welding torch assembly includes a welding torch configured to generate a welding arc between the welding torch and a workpiece. The welding torch assembly also includes an optical sensor coupled to the welding torch and configured to output a signal indicative of light sensed by the optical sensor to a travel speed sensing system. The travel speed sensing system is configured to determine a travel speed of the welding torch based on the signal.

In a further embodiment, a welding system includes a travel speed sensing system. The travel speed sensing system includes an array of optical sensors disposed about a weld area. The optical sensors are configured to sense light emitted from a welding arc produced by the welding torch. The travel speed sensing system is configured to determine a travel speed of the welding torch based on the sensed light.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, provided herein are systems and methods for determining the travel speed of a welding device during a welding operation. The foregoing systems and methods may be used separately or in combination to obtain information during the welding operation relating to the three dimensional speed of the welding torch along the surface of the metal being welded. In some embodiments, these methods may be utilized in unconstrained or manual welding operations to offer advantages over traditional systems in which it may be difficult to measure the weld motion. However, the foregoing systems and methods may be utilized in a variety of suitable welding systems, such as automated or robotic systems.

Present embodiments are directed toward systems and methods for sensing a travel speed of a welding torch using an optical detection system. More specifically, the disclosed systems include a travel speed sensing system that monitors a light or image associated with the welding system via at least one optical sensor, and detects or determines a travel speed of the welding torch, a direction of torch movement, or both, based on the monitored light. The determined weld travel speed may be utilized to evaluate the heat input to a welding workpiece at a given time. In addition, such information may be utilized to determine a position, velocity, and/or orientation of the welding torch in certain embodiments. In some embodiments, the travel speed sensing system may include a single optical sensor (e.g., cameras), or an array of optical sensors, located throughout a weld area to detect a light emitted from the welding arc produced by the welding torch. The term "array" in the following discussion refers to an arrangement of two or more elements (e.g., optical sensors). In other embodiments, a single optical sensor may be disposed on the welding torch, and the optical sensor may acquire images representative of a surface in a weld area where the workpiece being welded. In such embodiments, the optical sensor may be part of an optical surface motion sensor that emits light toward the surface of the workpiece, and detects the light reflected from the surface. By monitoring a change in images, light emitted, or light reflected via one or more optical sensors throughout the system, the travel speed sensing system may determine a change in spatial location of the welding torch with respect to time.

Figure 1:
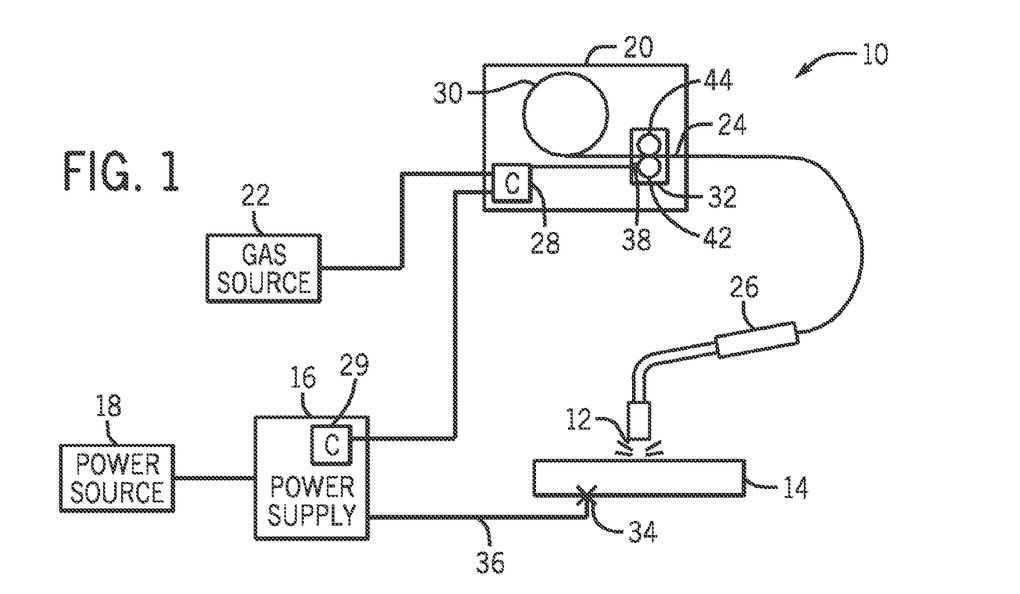
FIG. 1 is a block diagram of an embodiment of a welding system utilizing a welding torch.

Turning now to the figures, FIG. 1 is a block diagram of an embodiment of a welding system 10 in accordance with the present techniques. The welding system 10 is designed to produce a welding arc 12 on a workpiece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding torch 26 is configured to generate the welding arc 12 between the welding torch 26 and the workpiece 14. The welding wire 24 is fed through the welding torch 26 to the welding arc 12, molten by the welding arc 12, and deposited on the workpiece 14.

The wire feeder 20 will typically include control circuitry, illustrated generally by reference numeral 28, which regulates the feed of the welding wire 24 from a spool 30, and commands the output of the power supply 16, among other things. Similarly, the power supply 16 may include control circuitry 29 for controlling certain welding parameters and arc-starting parameters. The spool 30 will contain a length of welding wire 24 that is consumed during the welding operation. The welding wire 24 is advanced by a wire drive assembly 32, typically through the use of an electric motor under control of the control circuitry 28. In addition, the workpiece 14 is coupled to the power supply 16 by a clamp 34 connected to a work cable 36 to complete an electrical circuit when the welding arc 12 is established between the welding torch 26 and the workpiece 14.

Placement of the welding torch 26 at a location proximate to the workpiece 14 allows electrical current, which is provided by the power supply 16 and routed to the welding torch 26, to arc from the welding torch 26 to the workpiece 14. As described above, this arcing completes an electrical circuit that includes the power supply 16, the welding torch 26, the workpiece 14, and the work cable 36. Particularly, in operation, electrical current passes from the power supply 16, to the welding torch 26, to the workpiece 14, which is connected back to the power supply 16. The arcing generates a relatively large amount of heat that causes part of the workpiece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Presently disclosed embodiments are directed to an optical-based travel speed sensing system used to detect a change in position of the welding torch 26 over time throughout the welding process. In some embodiments, the travel speed of the welding torch 26 may refer to a change in three dimensional position of the welding torch with respect to time. In other embodiments, the travel speed of the welding torch 26 may refer to a change in two dimensional position of the welding torch 26 within a plane parallel to a welded surface of the workpiece 14. Although FIG. 1 illustrates a gas metal arc welding (GMAW) system, the presently disclosed techniques may be similarly applied across other types of welding systems, including gas tungsten arc welding (GTAW) systems and shielded metal arc welding (SMAW) systems. Accordingly, embodiments of the optical detection based travel speed sensing systems may be utilized with welding systems that include the wire feeder 20 and gas source 22 or with systems that do not include a wire feeder and/or a gas source, depending on implementation-specific considerations.

Figure 2:
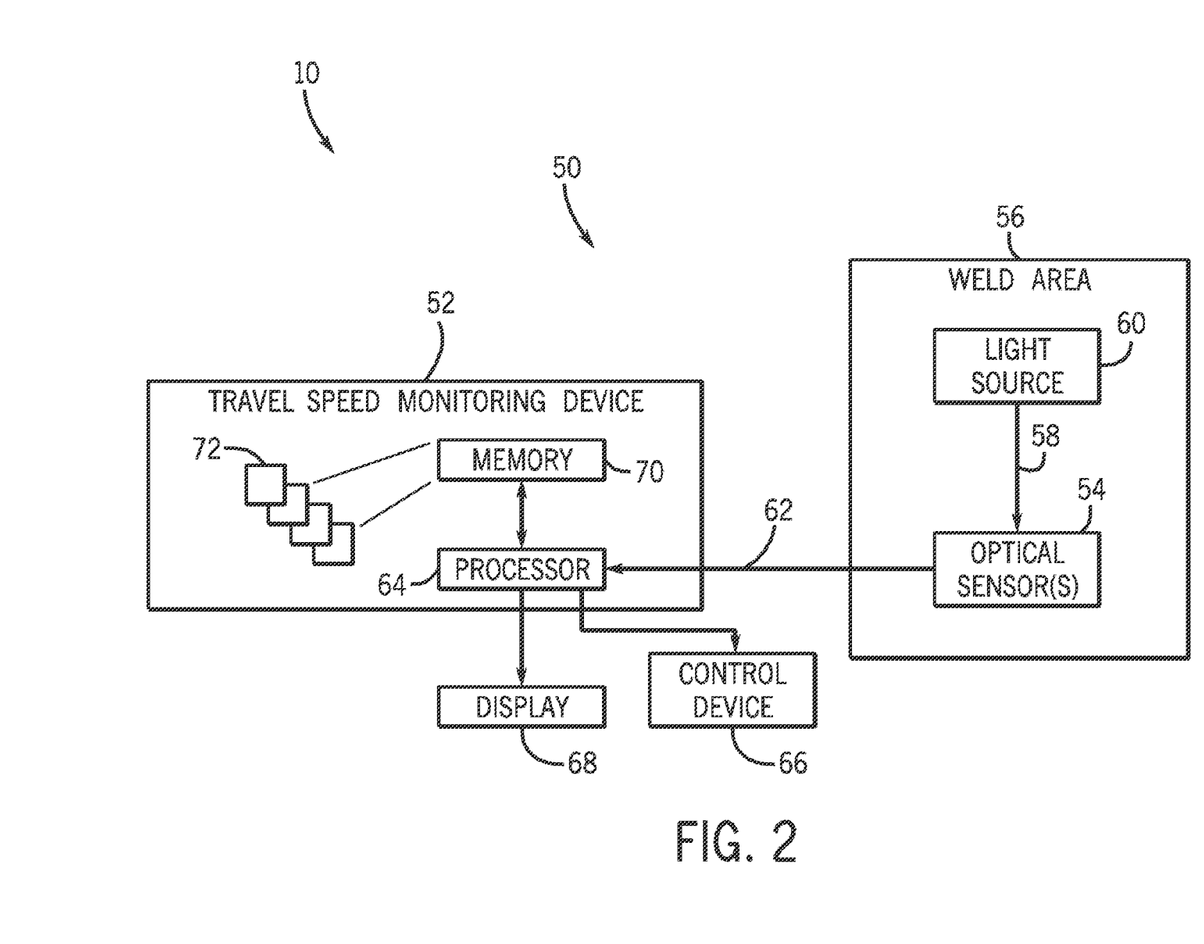
FIG. 2 is a block diagram of an embodiment of the welding system of FIG. 1, including a travel speed sensing system for detecting a travel speed of the welding torch.

FIG. 2 is a block diagram of an embodiment of the welding system 10, including a travel speed sensing system 50 in accordance with presently disclosed techniques. The travel speed sensing system 50 may include, among other things, a travel speed monitoring device 52 configured to process signals received from one or more optical sensors 54 disposed about a weld area 56. The optical sensors 54 may be any desirable type of sensor that converts light into a signal 62. For example, the optical sensors 54 may include any number or arrangement of cameras disposed about the weld area 56. The signal 62 generated by the optical sensors 54 may include image data (e.g., pixel values) or any other appropriate arrangement of data representative of light intensity. The weld area 56 may include a weld cell within which a welding operator is using the welding system 10 to perform a welding operation. In some embodiments, the weld area 56 may include a surface or structure upon which the workpiece 14 is located throughout the welding process, or the workpiece 14 itself.

The optical sensor 54 may be used to monitor a light 58 that is indicative of the position of the welding torch 26, and the light 58 may come from a light source 60 within the weld area 56. For example, the light 58 may be emitted directly from the welding arc 12 produced by the welding torch 26. In other embodiments, the light 58 may be reflected from a surface in the weld area 56. The one or more optical sensors 54 may convert the light 58 incident on the optical sensors 54 into one or more signals 62, which may include image data. The travel speed sensing system 50 may then transmit the signals 62 to a processor 64 of the travel speed monitoring device 52.

As shown, the travel speed monitoring device 52 may include the processor 64, which receives inputs such as image data from the optical sensors 54 via the signal 62. Each signal 62 may be communicated over a communication cable, or wireless communication system, from the one or more optical sensors 54 located throughout the weld area 56. In an embodiment, the processor 64 may also send control commands to a control device 66 of the welding system 10 in order to implement appropriate actions within the welding system 10. For example, the control device 66 may control a welding parameter (e.g., power output, wire feed speed, gas flow, etc.) based on the determined travel speed of the welding torch 26. The processor 64 also may be coupled with a display 68 of the travel speed monitoring device 52, and the display 68 may provide a visual indicator of the travel speed of the welding torch 26 based on the determined travel speed.

Further, the processor 64 is generally coupled to a memory 70, which may include one or more software modules 72 that contain executable instructions, transient data, input/output correlation data, and so forth. The memory 70 may include volatile or non-volatile memory such as magnetic storage memory, optical storage memory, or a combination thereof. Furthermore, the memory 70 may include a variety of machine readable and executable instructions (e.g., computer code) configured to provide a calculation of weld travel speed, given input optical-based sensor data. Generally, the processor 64 receives such sensor data from the one or more optical sensors 54 in the weld area 56, and references data stored in the memory 70 to implement such calculation. In this way, the processor 64 is configured to determine a travel speed of the welding torch 26, based at least in part on the signal 62.

In some embodiments, the travel speed sensing system 50 may be provided as an integral part of the welding system 10 of FIG. 1. That is, the travel speed sensing system 50 may be integrated into a component of the welding system 10, for example, during manufacturing of the welding system 10. For example, the power supply 16 may include appropriate computer code programmed into the software to support the travel speed sensing system 50. However, in other embodiments, the travel speed sensing system 50 may be provided as a retrofit kit that may enable existing welding systems 10 with the optical-based travel speed sensing capabilities described herein. The retrofit kit may include, for example, the travel speed sensing system 50, having the processor 64 and the memory 70, as well as one or more optical sensors 54 from which the travel speed sensing system 50 receives sensor input. In some embodiments, the retrofit kit may also include the welding torch 26, having the optical sensor 54 and/or a light emitting device installed thereon. To that end, such retrofit kits may be configured as add-ons that may be installed onto existing welding systems 10, providing travel speed sensing capabilities. Further, as the retrofit kits may be installed on existing welding systems 10, they may also be configured to be removable once installed.

Figure 3:
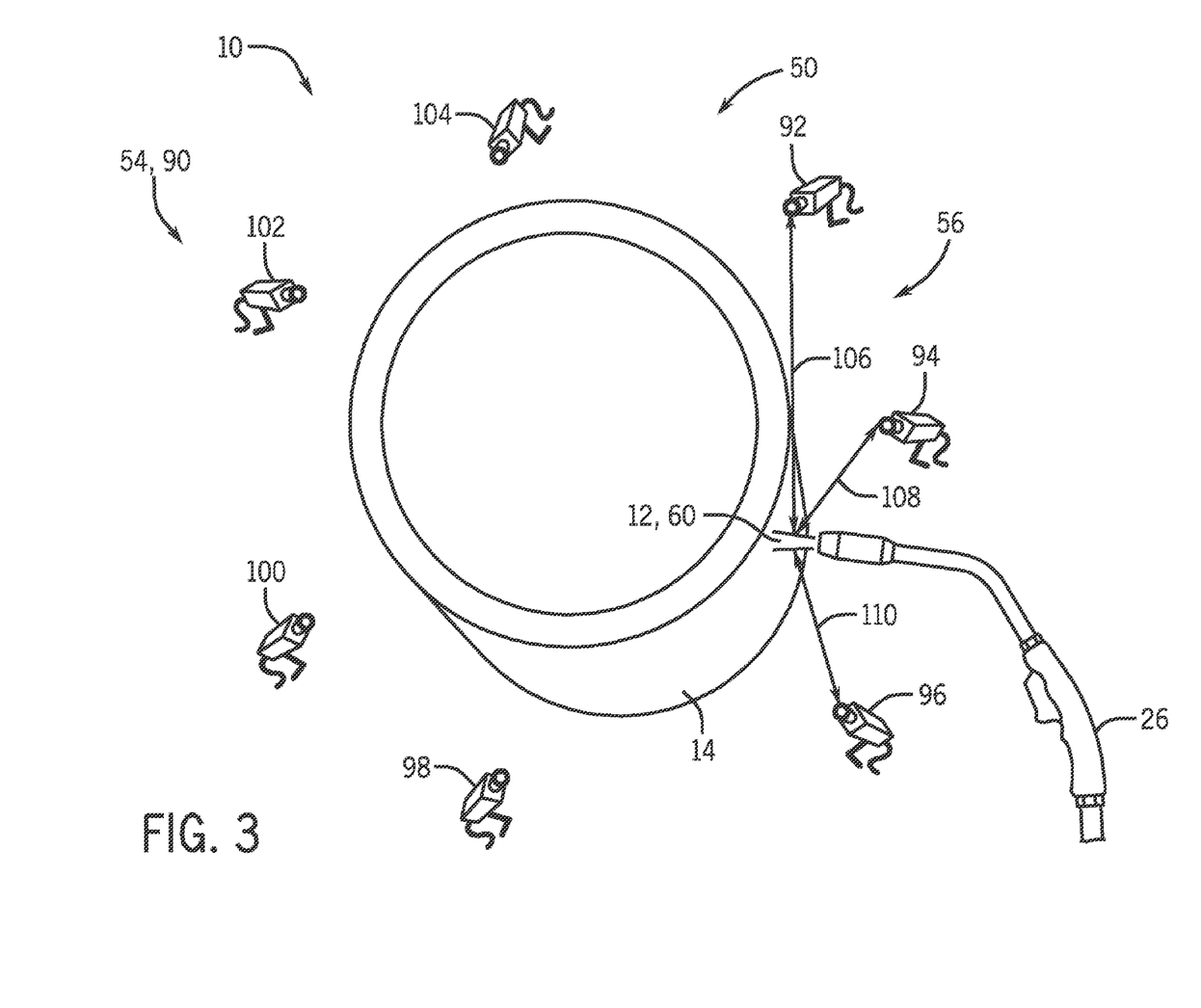
FIG. 3 illustrates an embodiment of the welding system of FIG. 2, including a camera monitoring array for determining the travel speed of the welding torch.

FIG. 3 illustrates an embodiment of the welding system 10 of FIG. 2, capable of determining the travel speed of the welding torch 26 during a welding operation. In the illustrated embodiment, the welding torch 26 is utilized to produce the welding arc 12 on the workpiece 14, which is a metal pipe in the depicted example. The illustrated welding system 10 also includes the travel speed sensing system 50, in which the one or more optical sensors 54 include a camera monitoring array 90 surrounding the weld area 56. The camera monitoring array 90 includes a plurality of cameras 92, 94, 96, 98, 100, 102, and 104 spaced about the weld area 56. In certain embodiments, each camera may include an imager or a precision spaced and aligned dual imager stereo camera. Further, in some embodiments, the cameras may be arranged so that two or more cameras maintain a suitable line of sight to the welding arc 12 at a given time. For example, in the illustrated embodiment, the cameras 92, 94, and 96 maintain lines of sight represented by arrows 106, 108, and 110, respectively, to the welding arc 12. As described in more detail below, the cameras may determine the location of the welding arc 12 using image processing techniques, such as stereo image comparison, triangulation, pixel mapping, or any other suitable technique known to those skilled in the art.

More specifically, during operation, in one embodiment, the camera monitoring array 90 may be used to monitor changes in the position of the welding torch 26 by identifying light emitted from the welding arc 12. That is, the welding arc 12 functions as the light source 60 of the travel speed sensing system 50 in the illustrated embodiment. In certain embodiments, light filters may be placed between the imager and the welding torch 26 to reduce or eliminate the background light reaching the imager. The foregoing feature may offer the advantage of simplifying the process of removing background light from the image. Further, in some embodiments, the filters may also be designed to reduce the bright light directly from the welding arc 12 to a smaller, more point-like emission from the brightest point of the welding arc 12 for position localization. In embodiments in which the welding motion is limited to a plane or other predefined surfaces, it may be possible to map the surface(s) to pixels in the imager, thereby enabling tracking of the changes in position of the welding torch 26 as a function of time. In such embodiments, a single imager may be utilized to determine the position of the welding torch 26, assuming the welding arc 12 is visible to the imager. In other embodiments, such as embodiments including unconstrained welding motion, two or more cameras may be utilized to locate the welding arc 12, and the travel speed sensing system 50 may calculate changes in position of the welding torch 26 with respect to time using any suitable stereo or geometric triangulation techniques.

In certain embodiments, each camera illustrated in FIG. 3 may represent a stereo camera pair, and each pair may be mounted in a single housing to monitor the welding operation. In some embodiments, the alignment and spacing of each imager pair mounted in a single housing may be controlled to address implementation-specific alignment or calibration parameters of the travel speed sensing system 50. In some embodiments, each stereo camera may be a "smart" camera having onboard processing hardware capable of processing the received images and sharing a relative location of the welding arc 12 with the travel speed monitoring device 52, thus reducing the amount of information to be shared by the camera array network and reducing the computational power necessary at the processor 64.

Figure 4:
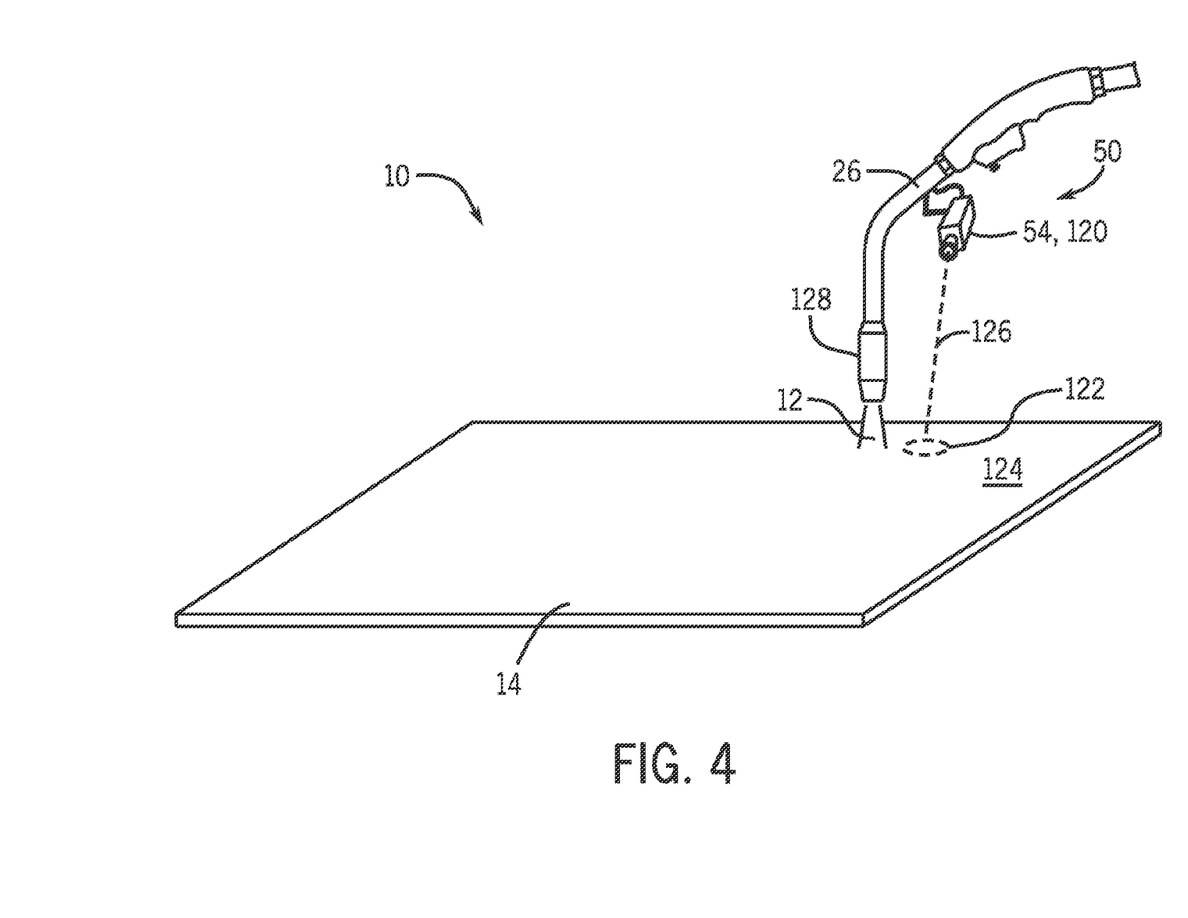
FIG. 4 illustrates an embodiment of the welding system of FIG. 2, including a camera mounted on the welding torch to determine a travel speed of the welding torch.

FIG. 4 illustrates another embodiment of the welding system 10 of FIG. 2, including the travel speed sensing system 50 used to determine a travel speed of the welding torch 26. In the illustrated embodiment, the one or more optical sensors 54 include a camera 120 mounted to the welding torch 26. The camera 120 may be used to monitor changes in the position of the welding torch 26 by identifying a region 122 of a surface 124 of the workpiece 14. The region 122 may be identified on surfaces located throughout the weld area 56 that are not limited to the surface 124 of the workpiece 14. For example, the surface could be a surface of a structure upon which the workpiece 14 is located. Because the camera 120 is mounted to the welding torch 26, the region 122 detected by the camera 120 changes as the welding torch 26 is moved relative to the workpiece 14. It may be desirable for the camera 120 to be mounted to the welding torch 26 such that a line of sight 126 of the camera is substantially parallel (e.g., within 5 degrees) with an axis of a torch tip 128 of the welding torch 26. The camera 120 may include a range finding mechanism (e.g., dual imager stereo camera) used to determine a distance between the camera 120 and the surface 124, and the travel speed sensing system 50 may determine the travel speed of the welding torch 26 partly based on this distance. That is, the travel speed monitoring device 52 may use the determined distance to correct for changes in tip-to-work distance of the welding torch 26 throughout welding. Other types of range finding mechanisms may include sonic ranging systems, acoustic range finders, and laser range finders, among others.

The travel speed sensing system 50 may utilize any number of suitable image processing techniques to determine travel speed of the welding torch 26 based on the monitored image. For example, certain features visible in the region 122 may be detected at different positions within the image collected via the camera 120 throughout the welding operation. The processor 64 may compare these positions via optical flow algorithms (e.g., pixel mapping techniques) to determine the distance traveled by the welding torch 26 over a given time interval, thus determining the travel speed of the welding torch 26.

In some embodiments, the workpiece 14 may be prepared with incremental markings such that the position of the welding torch 26 may be determined based on the images acquired via the camera 120, if an initial position and orientation of the welding torch 26 are known. For example, the surface 124 may be modified by the application of a high contrast pattern to enhance the ability of the travel speed sensing system 50 to track torch motion. The pattern may be applied to the surface 124 as tape, paint, or projected light. The pattern may provide edges or regions of alternating light intensity when viewed by the optical sensor 54, and these edges may allow the travel speed sensing system 50 to more easily track the relative motion between the camera 120 and the monitored surface 124. The pattern may include, for example, checkerboard tape applied to the surface 124, white paint with black speckle spray painted on the surface 124, or a grid of light projected onto the surface 124 by a laser or LED.

It should be noted that in other embodiments, one or more additional cameras may be located at any other suitable location around the welding torch 26, for example, on an opposite side of the welding torch 26. In such embodiments, this additional camera may provide surface motion information that may be used to detect a rotation of the welding torch 26 and/or a tip-to-work distance of the welding torch 26 that may not be available using only one camera. In addition, the multiple cameras may provide redundant surface motion information that may be utilized if the direction of welding points one of the two cameras 120 toward a hot/molten trailing weld bead. Light emitted from the weld bead may otherwise saturate or obscure the light information collected via the camera 120. In some embodiments, the camera 120 may be configured to operate with a relatively high dynamic range (e.g., utilizing a logarithmic optical sensor) to avoid saturation of the images due to flashing of the welding arc 12. In some embodiments, it may be possible for an camera 120 or imager to set the gain for the image by operating in a rolling shutter mode, processing the amount of light seen by the first several pixels and adjusting the exposure time or gain for the rest of the image based upon the light level observed by those first few pixels, to avoid saturation in the rest of the image. In other embodiments, the travel speed monitoring device 52 may utilize multiple exposure techniques to correct for saturation of the images collected. More specifically, the camera 120 may acquire multiple images and send the image data to the processor 64, which then combines the images to determine an image with a desired exposure. The processor 64 then processes this new image to determine the weld travel speed of the welding torch 26.

Although the illustrated camera 120 is coupled to the welding torch 26 at a position relatively far from the torch tip 128, it may be desirable in other embodiments for the camera 120 (or other optical sensor 54) to be located near the torch tip 128. In such embodiments, a protective covering may be disposed over the optical sensor 54 to protect the optical sensor 54 from weld spatter. This protective covering may include a plastic and/or optically clear covering that weld spatter does not readily stick to or pit.

Figure 5:
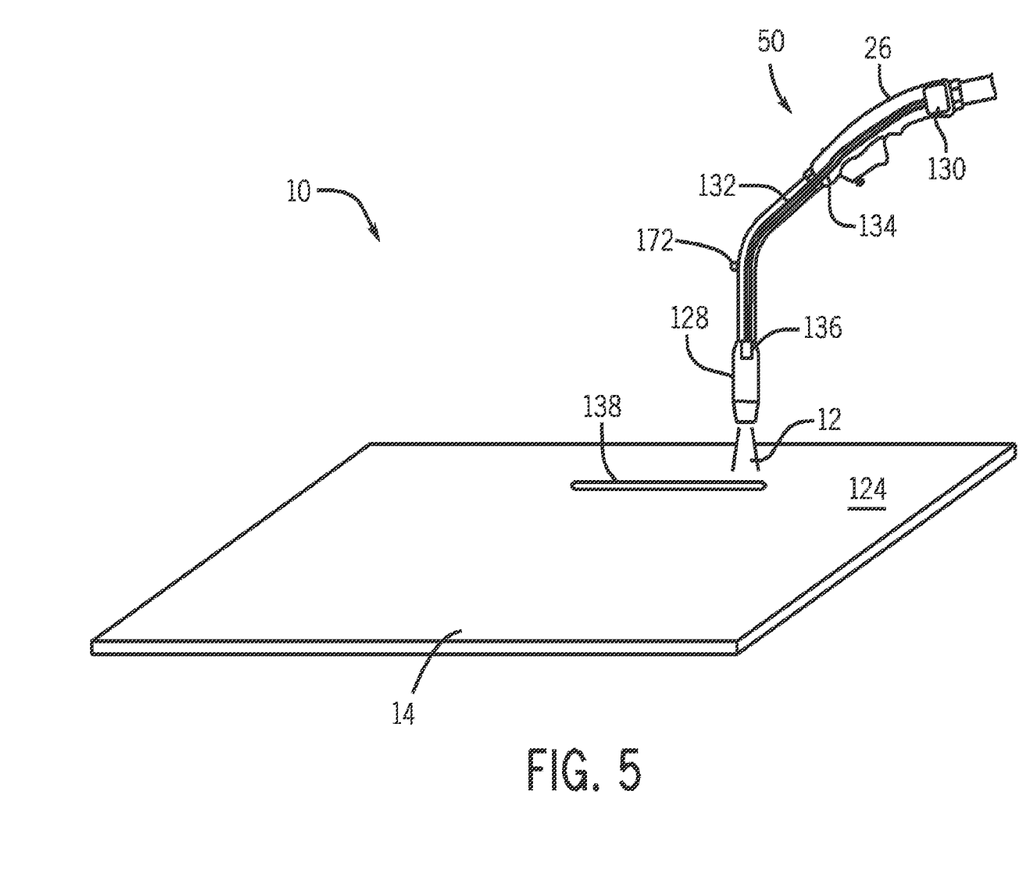
FIG. 5 illustrates an embodiment of the welding system of FIG. 2, including an optical surface motion sensor module to determine a travel speed of the welding torch.
Figures 6, 7:
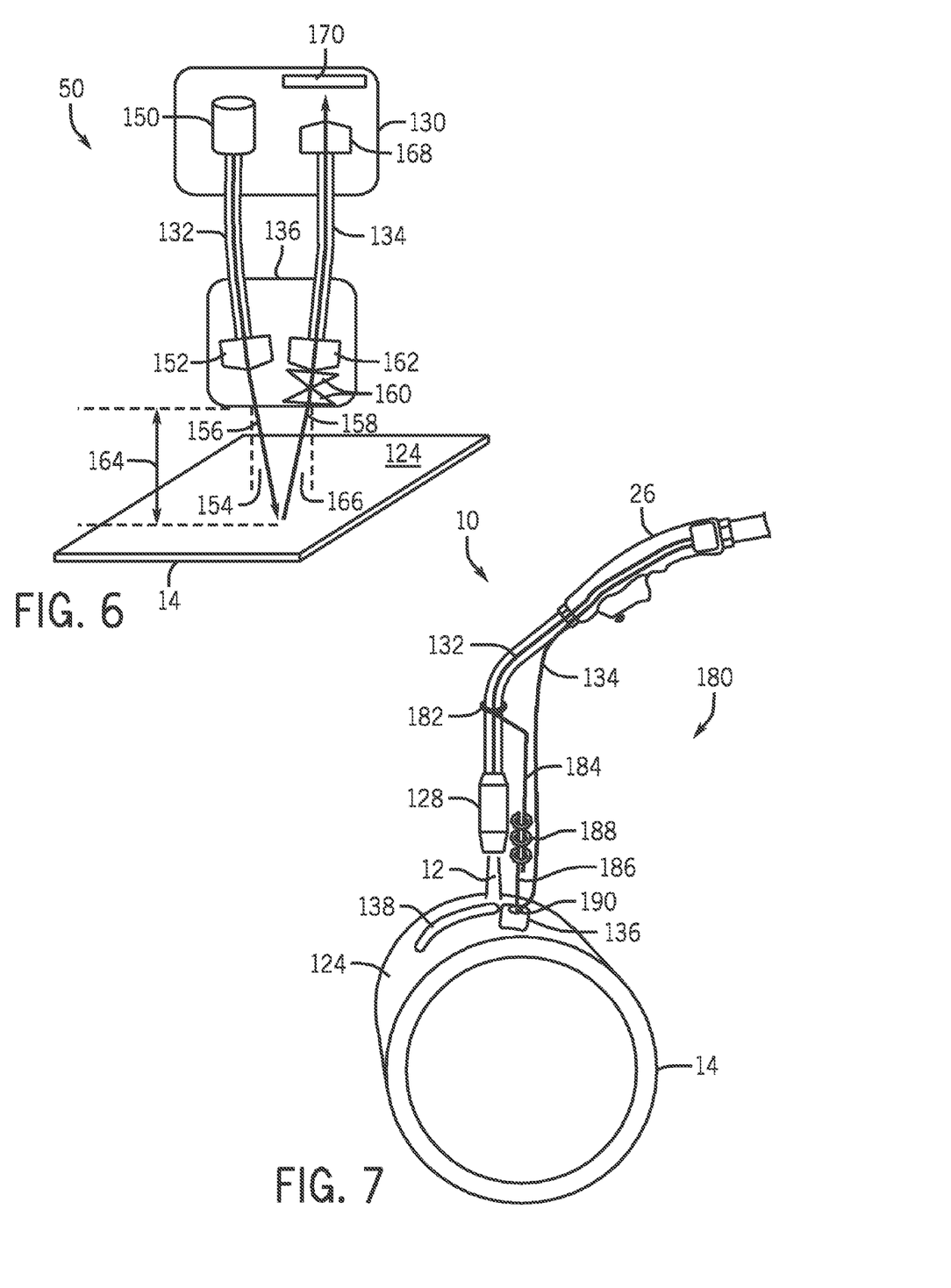
FIG. 6 illustrates an embodiment of an optical system that may be associated with the optical motion sensor of FIG. 5 to determine a travel speed of the welding torch.
FIG. 7 illustrates an embodiment of a mechanical arrangement capable of holding an optical fiber alignment device against a workpiece weld surface.

FIGS. 5-7 illustrate additional embodiments of systems and methods capable of determining the travel speed of the welding torch 26 by utilizing a variety of optical arrangements. Specifically, FIG. 5 illustrates an embodiment of the welding system 10 of FIG. 2 wherein the travel speed sensing system 50 includes an optical surface motion sensor 130 disposed on the welding torch 26. In the illustrated embodiment, the optical sensor 54 and the light source 60 (surface illumination light source) are located in the optical surface motion sensor 130. In this way, the optical surface motion sensor 130 is configured to output light toward the surface 124 of the workpiece 14 via the surface illumination light source and to monitor the light reflected from the surface 124 via the optical sensor 54.

In the illustrated embodiment, surface illumination light is carried from the illumination light source by an illumination optical fiber 132 closer to the surface 124 of the workpiece 14 being welded. During operation, light exits the illumination optical fiber 132, strikes the nearby surface 124 of the workpiece 14 and some of this light is reflected. A light collection optical fiber 134 captures at least a portion of the reflected light and transmits it back to the optical sensor 54 located in the optical surface motion sensor 130. It should be noted that the fibers 132 and 134 may be made of any suitable material capable of withstanding typical weld temperatures, such as high temperature glass/plastic that is cladded, coated, or jacketed with high temperature resistant material. Further, in some embodiments, the numerical aperture of the optical fibers may be chosen to optimize the collection of reflected/scattered light from the surface 124.

Further, an optical fiber alignment device 136 holds and maintains the optical fibers at the desired angle such that the central ray of light emitted from the illumination optical fiber 132 enters the center of the light collection optical fiber 134 if it experiences specular reflection from the surface 124 when the welding angle is approximately zero degrees. The optical fiber alignment device 136 also holds the fibers relative to the torch tip 128. In some embodiments, the optical fiber alignment device 136 may include collimators, lenses, or filters to maximize the reflected light collected and minimize light entering the optical fibers directly from the welding arc 12.

It should be noted that in other embodiments, an additional pair of illumination and light collection optical fibers may be located at any other suitable location around the welding torch 26, for example, on the opposite side of the torch tip 128. In such embodiments, this additional pair of fibers may be connected to separate illumination light sources and light sensors in the optical surface motion sensor 130, thereby providing redundant surface motion information. This redundancy may be desirable if the direction of welding points one of the two pairs of sensors at a hot/molten trailing weld bead 138.

In the welding system 10 illustrated in FIG. 5, light is emitted onto the surface 124 and some of that light is reflected back into the optical sensor 54, which may be a multiple pixel image sensor. In one mode of operation, successive high speed images may be acquired and compared to enable tracking of the motion of features in the image as a function of time across the pixels of the imager. The rate of translation of these features across the imager field of view may be interpreted as a weld travel speed corresponding to the travel speed of the welding torch 26 throughout the welding operation, assuming the distance between the imager and the surface 124 remains relatively constant and the angle at which the imager views the surface 124 remains relatively constant.

In some embodiments, phase-based algorithms may be utilized in the image processing schemes as well. Such techniques may be particularly useful in variable lighting conditions, such as those experienced near the welding arc 12. That is, phase based algorithms may be less susceptible to changes in brightness from frame to frame due to variable lighting produced by the welding arc 12. These algorithms may utilize, for example, a Fourier transform, convolution with Gabor filters, high-pass or band-pass filtering, or any other appropriate methods to estimate a local phase in the image before processing with an optical flow algorithm. The local phase may include features (e.g., edges) that are not easily identifiable based on light intensity. The travel speed monitoring device 52 may estimate the local phase, and then monitor regional changes in the phase over time (e.g., successive images) to estimate a relative motion of the welding torch 26. In this way, the travel speed sensing system 50 may apply optical flow algorithms that utilize the estimated local phase from at least a portion of collected images to determine the overall motion, and thus weld travel speed.

FIG. 6 illustrates an embodiment of certain components that may be present in the optical surface motion sensor 130 located on the welding torch 26 of FIG. 5. In the depicted embodiment, light is emitted from a light source 150 (e.g., a laser) coupled to the illumination optical fiber 132. The light travels down the illumination optical fiber 132 and through a lens 152 held within the optical fiber alignment device 136. Light is emitted at an angle 154 with respect to the optical fiber alignment device 136, as indicated by arrow 156. A portion of the light reflects off of the surface 124 of the workpiece 14 and reaches the entrance to the light collection optical fiber 134, as indicated by arrow 158. In the illustrated embodiment, the light passes through collimators or filters 160 and a lens 162 before entering the light collection optical fiber 134. In certain embodiments, the angle 154 may be based upon an average expected tip-to-work distance 164 such that specular reflections will enter the light collection optical fiber 134 that is angled at an opposing (but similar value) angle 166. The light that exits the light collection optical fiber 134 enters a lens 168 that focuses the light upon an imager 170. In some embodiments, the light source 150 may output a narrow band of light frequencies, and the filters 160 may be configured to accept primarily those frequencies emitted by the light source 150. This may increase a signal to noise ratio of the light collected from the light source 50 as compared with external variable intensity lighting. In this way, the optical surface motion sensor 130 is configured to filter the light reflected from the surface 124 via the filters 160 to produce a filtered light at one or more desired frequencies, so that only the filtered light is sensed via the imager 170.

It should be noted that this type of optical surface motion sensor 130 may be used in a redundant system to detect a distance from the optical surface motion sensor 130 to the workpiece 14. The optical surface motion sensor 130 may automatically adjust a focus length of the imaging system based on the detected distance from the sensor to the workpiece 14. The optical fibers 132, 134 may enable delicate electronics located in the optical surface motion sensor 130 to be mounted at a location of the welding torch 26 away from the welding arc 12. In other embodiments, however, the optical surface motion sensor 130 may be mounted to the welding torch 26 near the torch tip 128. Such optical surface motion sensors 130 may include relatively heat-resistant, shock-resistance imagers that monitor the surface 124 directly through a lens, and not via optical fibers.

It should be noted that in some embodiments, the angle of the welding torch 26 relative to the surface 124, as well as the tip-to-work distance 164 of the welding torch 26, may vary over time during a welding operation. It may be desirable for the welding system 10 to be capable of correcting for such changes in welding torch position, in order to determine an accurate weld travel speed. In some embodiments, the torch angle or changes in the torch angle over time may be sensed and utilized to correct the travel speed estimate. For example, in the embodiment shown in FIG. 5, an inclinometer 172, such as an electrolytic tilt sensor or low-G triaxial accelerometer, may be placed on the welding torch 26 to measure torch angle, thus enabling changes in the angle of the welding torch 26 to be monitored. Further, for torch angles approximately perpendicular to the surface 124, relatively small changes in angle may lead to predictable small translations in the images received by the imager. These translations due to torch angle changes may be subtracted from the overall observed motion prior to making a weld travel speed determination. However, in other embodiments, any of a variety of suitable techniques may be utilized to monitor and accommodate changes in the torch angle of the welding torch 26. For example, in another embodiment, the optical fiber alignment device 136 may be placed in contact with the surface 124.

FIG. 7 illustrates an embodiment of the welding system 10, including a suitable mechanical arrangement for holding the optical fiber alignment or mechanical rolling device 136 against the surface 124 of the workpiece 14. The illustrated arrangement may maintain the optical fiber alignment device 136 in this position for a variety of torch angles (i.e., angles from the welding torch 26 to the surface 124) and a range of distances from the torch tip 128 to surface 124. The optical fiber alignment device 136 is connected to the welding torch 26 by a mechanical linkage assembly 180, which may include an attachment ring 182, an upper link 184, a lower link 186, a return force element 188, and a joint 190. In the illustrated embodiment, the attachment ring 182 enables the upper link 184 to be positioned through a range of angles rotating around an axis parallel to the major axis of the torch tip 128. This rotation may enable an operator to place the optical fiber alignment device 136 in a location that will not interfere with the weld bead 138 or obstacles associated with the surface 124 and will not block the operator's field of view of the welding arc 12.

The upper link 184 is connected to the lower link 186 by a sliding linkage that allows the upper and lower link to slide relative to one another along their lengths. In the illustrated embodiment, the sliding linkage includes a return force element 188, such as a spring, to allow the optical fiber alignment device 136 to maintain contact with the surface 124 as the distance between the welding torch 26 and surface 124 changes. The lower link 186 is attached to the optical fiber alignment device 136 by the joint 190, which may be a ball joint. The joint 190 may enable the relative angle between the optical fiber alignment device 136 and the lower link 186 to change such that the optical fiber alignment device 136 and the surface 124 maintain a substantially constant contact angle. The illumination optical fiber 132 and the light collection optical fiber 134 may be held at predetermined locations to the welding torch 26 and/or to the mechanical linkage assembly 180 in a way that holds the fibers while enabling them to flex or translate with the linkage, while reducing mechanical stress induced in the fibers.

Figure 8:
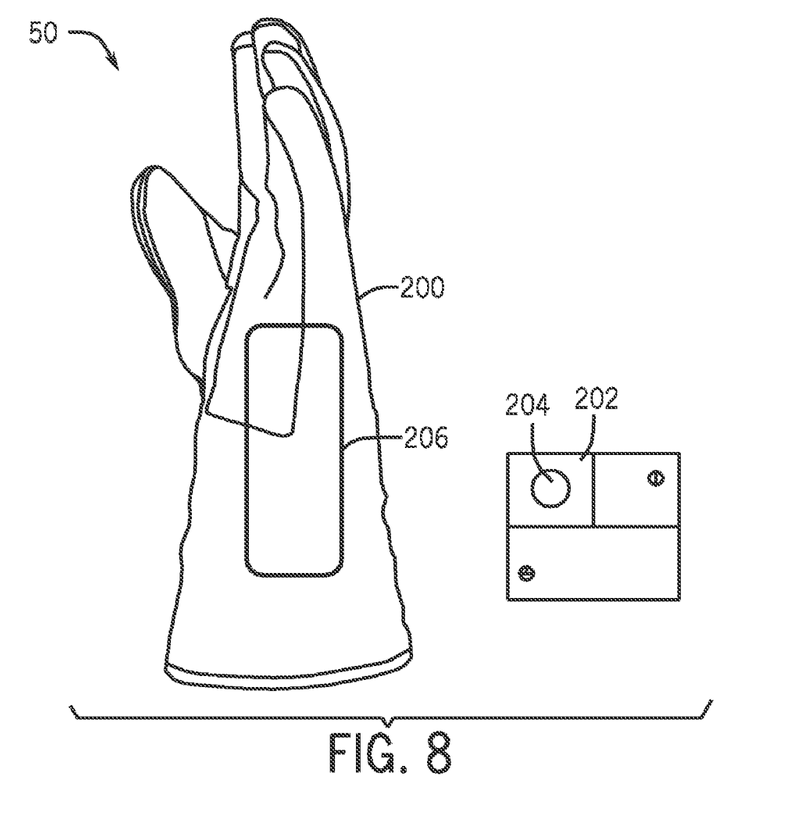
FIG. 8 illustrates an embodiment of a welding system including a welding glove and an integrated trackball device for determining a travel speed of a welding torch.

FIG. 8 illustrates an embodiment of components of the travel speed sensing system 50 including a welding glove 200 and a trackball device 202. One or more low-profile trackballs 204 may be located on the welding glove 200, such as in a region 206 of the welding glove 200 where the operator might naturally drag the welding glove 200 across the surface 124 while welding. Further, in another embodiment, the trackball device 202 may be located on any other suitable welding accessory, such as on a wristband or armband worn by the operator or at the end of the mechanical linkage assembly 180 described above and shown in FIG. 7. In another embodiment, the trackball 204 or other mechanical roller may be an optical surface motion sensor configured to be moved across the surface 124.

It should be noted that the trackball 204 may be any suitable mechanical device, such as a cylinder or wheel, that could be used to measure an instantaneous speed of the welding glove 200 and, therefore, of the welding torch 26, across the workpiece 14. For example, in an embodiment, the trackball 204 may include one or more low profile balls incorporated into the welding glove 200. The trackball device 202 may be incorporated into the welding glove 200 along an edge of the welding glove 200 near the lower palm on the pinkie finger side of the welding glove 200. In this embodiment, rotation of the trackballs 204 may be translated into a speed of the welding glove 200 along the surface 124 as long as the balls maintain contact with the surface 124. The trackball 204 may be made of a material capable of withstanding high temperatures typically associated with the workpiece 14. This may reduce any undesirable deformation of the trackball 204 as it grips the metal, so that slippage does not occur if the welding glove 200 is drug across the surface 124 with light pressure against the surface 124.

Rotation of the trackballs 204 may be measured with suitable optical encoders included in the trackball device 202. In some embodiments, the trackball 204 may have a pattern on its surface to enable the use of optical image processors to measure a rate of rotation in any direction of the trackball 204. Other standard encoder methods for measuring ball rotation may be used in other embodiments.

In the illustrated embodiment, a single trackball 204 is utilized. However, in other embodiments, multiple balls may be distributed over the edge and heel of the welding glove 200, thereby enabling greater variation in the welder hand position and contact points with the surface 124 being welded. In such embodiments, signals (e.g., 62) from the plurality of balls may be combined, for example, via averaging, after selecting only the balls fully involved (continuously moving) in motion detection at a given moment. Still further, glove trackball electronics may be battery powered, and the signal 62 from the glove trackball may be wirelessly transmitted to the travel speed monitoring device 52 to eliminate the need for wires to the welding glove 200.

Additionally, it should be noted that instead of using a mechanical trackball 204, in other embodiments, the surface 124 may be monitored via an optical surface motion sensor, such as the optical surface motion sensor 130 of FIGS. 5-7. More specifically, the light source 60 and the optical sensor 54 may be integrated into a device built into the region 206 of the welding glove 200 to be placed in contact with the surface 124. A glove structure housing the light source 60 and the optical sensor 54 may be designed to maintain a desired distance between the optical sensor 54 and the surface 124 for proper focusing. Such a glove structure could be made of a smooth, relatively low friction material to allow the welding glove 200 to slide across the surface 124.

In certain embodiments, it may be desirable to determine and monitor the travel speed of the welding torch over the total distance of the part being welded and not the total distance travelled by the welding torch. That is, in instances in which the operator performs a weld in a traditional pattern, such as weaving, the welding torch may travel a large distance while only covering a small portion of the workpiece. If such a technique is used by the operator, the interpretation of the weld travel speed signal may be adjusted to compensate for the weaving motion to derive the travel speed along the primary direction of the weld.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
 a hand held welding tool;
 an optical sensor configured to be coupled to the hand held welding tool, the optical sensor configured to sense light incident on the optical sensor; and
 a torch monitor configured to determine a position or orientation of the hand held welding tool based on the light sensed by the optical sensor.

2. The system of claim 1, wherein the hand held welding tool is configured for movement or manipulation by a human hand during a manual welding operation.

3. The system of claim 1, wherein the hand held welding tool comprises a welding gun used in gas metal arc welding (GMAW), an electrode holder used in shielded metal arc welding (SMAW), an electrode used in SMAW, a welding torch used in gas tungsten arc welding (GTAW), or a filler rod used in GTAW.

4. The system of claim 1, wherein the hand held welding tool is configured for live welding.

5. The system of claim 1, further comprising an optical fiber configured to be coupled to the hand held welding tool, the optical fiber being configured to capture the light and transmit the light to the optical sensor.

6. The system of claim 1, wherein the optical sensor is coupled to the hand held welding tool.

7. The system of claim 1, wherein a surface is augmented by application of a visible pattern to the surface, and the torch monitor is configured to determine the position or orientation of the hand held welding tool based on the light reflected off the visible pattern.

8. The system of claim 7, wherein the visible pattern comprises a painted or taped pattern.

9. The system of claim 1, wherein the position or orientation of the hand held welding tool comprises a real-time position or a real-time orientation of the hand held welding tool.

10. The system of claim 1, wherein the optical sensor comprises a range finder configured to determine a distance between the optical sensor and a surface, the torch monitor further configured to determine a contact tip to work distance of the hand held welding tool based on the distance.

11. A retrofit kit, comprising:
 a hand held welding tool;
 an optical sensor configured to be coupled to a hand held welding tool, the optical sensor configured to sense light incident on the optical sensor;
 a coupling mechanism configured to couple the optical sensor to the hand held welding tool; and
 a torch monitor configured to determine a position or orientation of the hand held welding tool based on the light sensed by the optical sensor.

12. The retrofit kit of claim 11, wherein the hand held welding tool is configured for movement or manipulation by a human hand during a manual welding operation.

13. The retrofit kit of claim 11, wherein the hand held welding tool comprises a welding gun used in gas metal arc welding (GMAW), an electrode holder used in shielded metal arc welding (SMAW), an electrode used in SMAW, a welding torch used in gas tungsten arc welding (GTAW), or a filler rod used in GTAW.

14. The retrofit kit of claim 11, wherein the hand held welding tool is configured for live welding.

15. The retrofit kit of claim 11, further comprising:
a light source coupled to the hand held welding tool, the light source configured to output the light toward a surface in a weld area; and
a collimator, lens, or filter configured to maximize collection of reflected light from the light source by the optical sensor.

16. The retrofit kit of claim 15, wherein the optical sensor is coupled to the hand held welding tool.

17. The retrofit kit of claim 11, wherein a surface is augmented by application of a visible pattern to the surface, and the torch monitor is configured to determine the position or orientation of the hand held welding tool based on the light reflected off the visible pattern.

18. The retrofit kit of claim 17, wherein the visible pattern comprises a painted or taped pattern.

19. The retrofit kit of claim 11, wherein the position or orientation of the hand held welding tool comprises a real-time position or a real-time orientation of the hand held welding tool angle.

20. The retrofit kit of claim 11, wherein the optical sensor comprises a range finder configured to determine a distance between the optical sensor and a surface, the torch monitor further configured to determine a contact tip to work distance of the hand held welding tool based on the distance.

* * * * *